(12) United States Patent
Chauvel et al.

(10) Patent No.: US 8,032,891 B2
(45) Date of Patent: Oct. 4, 2011

(54) ENERGY-AWARE SCHEDULING OF APPLICATION EXECUTION

(75) Inventors: Gerard Chauvel, Antibes (FR);
Dominique D'Inverno, Villeneuve-Loubet (FR); Serge Lasserre, Frejus (FR); Maija Kuusela, Mouans Sartoux (FR); Gilbert Cabillic, Brece (FR); Jean-Philippe Lesot, Etrelles (FR); Michel Banâtre, La Fresnais (FR); Frédéric Parain, Rennes (FR); Jean-Paul Routeau, Thorigné-Foillard (FR); Salam Majoul, Rennes (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/151,282

(22) Filed: May 20, 2002

(65) Prior Publication Data
US 2003/0217090 A1 Nov. 20, 2003

(51) Int. Cl.
*G06F 9/46* (2006.01)
*G06F 1/32* (2006.01)
(52) U.S. Cl. ........ 718/105; 718/102; 718/103; 718/104; 718/106; 718/107; 713/320
(58) Field of Classification Search .................. 718/102, 718/104, 107, 108, 106; 713/320
See application file for complete search history.

(56) References Cited

U.S. PATENT DOCUMENTS

| | | | | |
|---|---|---|---|---|
| 4,612,418 A * | 9/1986 | Takeda et al. | ................. | 379/146 |
| 5,790,817 A | 8/1998 | Asghar et al. | | |
| 5,887,143 A * | 3/1999 | Saito et al. | ..................... | 709/248 |
| 6,112,023 A * | 8/2000 | Dave et al. | ........................ | 703/27 |
| 6,112,221 A * | 8/2000 | Bender et al. | ................. | 718/102 |
| 6,112,225 A * | 8/2000 | Kraft et al. | ..................... | 709/202 |
| 6,195,676 B1 * | 2/2001 | Spix et al. | ..................... | 718/107 |
| 6,243,788 B1 * | 6/2001 | Franke et al. | ..................... | 711/3 |

(Continued)

FOREIGN PATENT DOCUMENTS

EP     1 182 538 A2    2/2002

(Continued)

OTHER PUBLICATIONS

Rae et al. "Application-Specific heterogeneous multiprocessor synthesis using differential-evolution", Proceeding $11^{th}$ International Symposium, Dec. 998. pp. 83-88.*

(Continued)

*Primary Examiner* — Kenneth Tang
(74) *Attorney, Agent, or Firm* — Ronald O. Neerings; Wade J. Brady, III; Frederick J. Telecky, Jr.

(57) ABSTRACT

A mobile device (10) manages tasks (18) using a scheduler (20) for scheduling tasks on multiple processors (12). To conserve energy, the set of tasks to be scheduled are divided into two (or more) subsets, which are scheduled according to different procedures. In a specific embodiment, the first subset contains tasks with the highest energy consumption deviation based on the processor that executes the task. This subset is scheduled according to a power-aware procedure for scheduling tasks primarily based on energy consumption criteria. If there is no failure, the second subset is scheduled according to a real-time constrained procedure that schedules tasks primarily based on the deadlines associated with the various tasks in the second subset. If there is a failure in either procedure, one or more tasks with the lowest energy consumption deviation are moved from the first subset to the second subset and the scheduling is repeated.

20 Claims, 3 Drawing Sheets

U.S. PATENT DOCUMENTS

| | | | |
|---|---|---|---|
| 6,353,844 B1* | 3/2002 | Bitar et al. | 718/102 |
| 6,430,594 B1* | 8/2002 | Akiyama et al. | 718/108 |
| 6,591,287 B1* | 7/2003 | More et al. | 718/102 |
| 6,889,330 B2* | 5/2005 | Chauvel et al. | 713/300 |
| 6,986,068 B2* | 1/2006 | Togawa | 713/320 |
| 2002/0019843 A1 | 2/2002 | Killian et al. | |
| 2002/0040442 A1* | 4/2002 | Ishidera | 713/300 |
| 2002/0073129 A1* | 6/2002 | Wang et al. | 709/102 |
| 2002/0099756 A1* | 7/2002 | Catthoor et al. | 709/102 |
| 2002/0120663 A1* | 8/2002 | Binns | 709/103 |
| 2002/0124196 A1* | 9/2002 | Morrow et al. | 713/320 |
| 2003/0028659 A1* | 2/2003 | Mesarina et al. | 709/231 |
| 2003/0061260 A1* | 3/2003 | Rajkumar | 709/104 |
| 2003/0115242 A1* | 6/2003 | Hayduk | 709/103 |
| 2004/0088710 A1* | 5/2004 | Ronkka et al. | 718/107 |

FOREIGN PATENT DOCUMENTS

| | | |
|---|---|---|
| WO | WO 02/39242 A1 | 5/2002 |

OTHER PUBLICATIONS

Rae et al. "Voltage reduction of application specific heterogeneous multiprocessor systems for power minimisation", Proceedings of the ASP-Dac 2000, Jan. 2000. pp. 147-152.*

Yang et al. "Energy-Aware Runtime Scheduling for Embedded-Multiprocessors SOCs", IEEE, 2001, pp. 46-58.*

Raghunathan et al. "Adaptive Power-Fidelity in Energy-Aware Wireless Embedded Systems", IEEE, 2001, pp. 106-115.*

Swaminathan et al. "Real-time task scheduling for energy-aware embedded systems", The Franklin Institute. Publsihed by Elsevier Science Ltd. 2001, pp. 729-750.*

"A Parallel Algorthm for Preemptive Scheduling of Uniform Machines", Charles U. Martel, Journal of Parallel and Distributed Computing Academic Press, Duluth, MN, US, vol. 5, No. 6, Dec. 1, 1988, pp. 700-715, XP000007702, ISSN: 0743-7315.

* cited by examiner

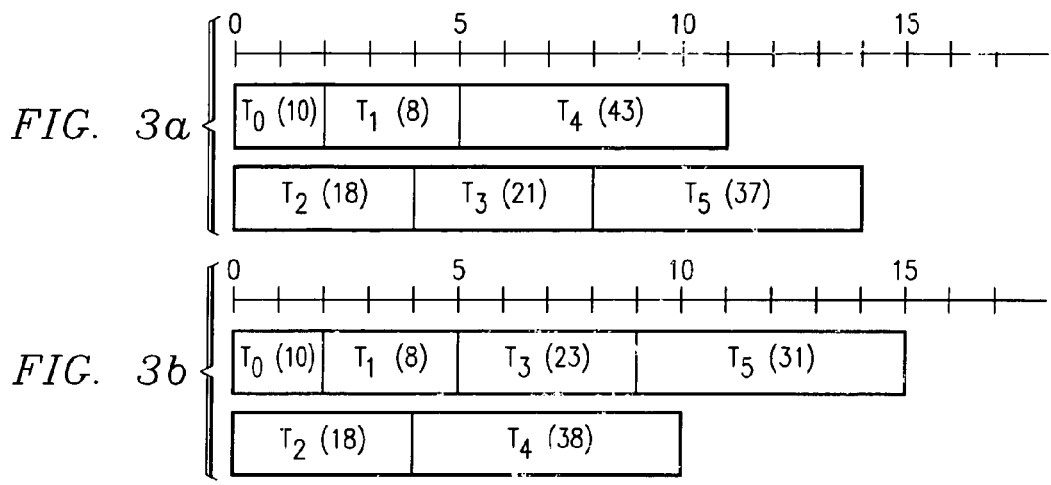
FIG. 3a
FIG. 3b
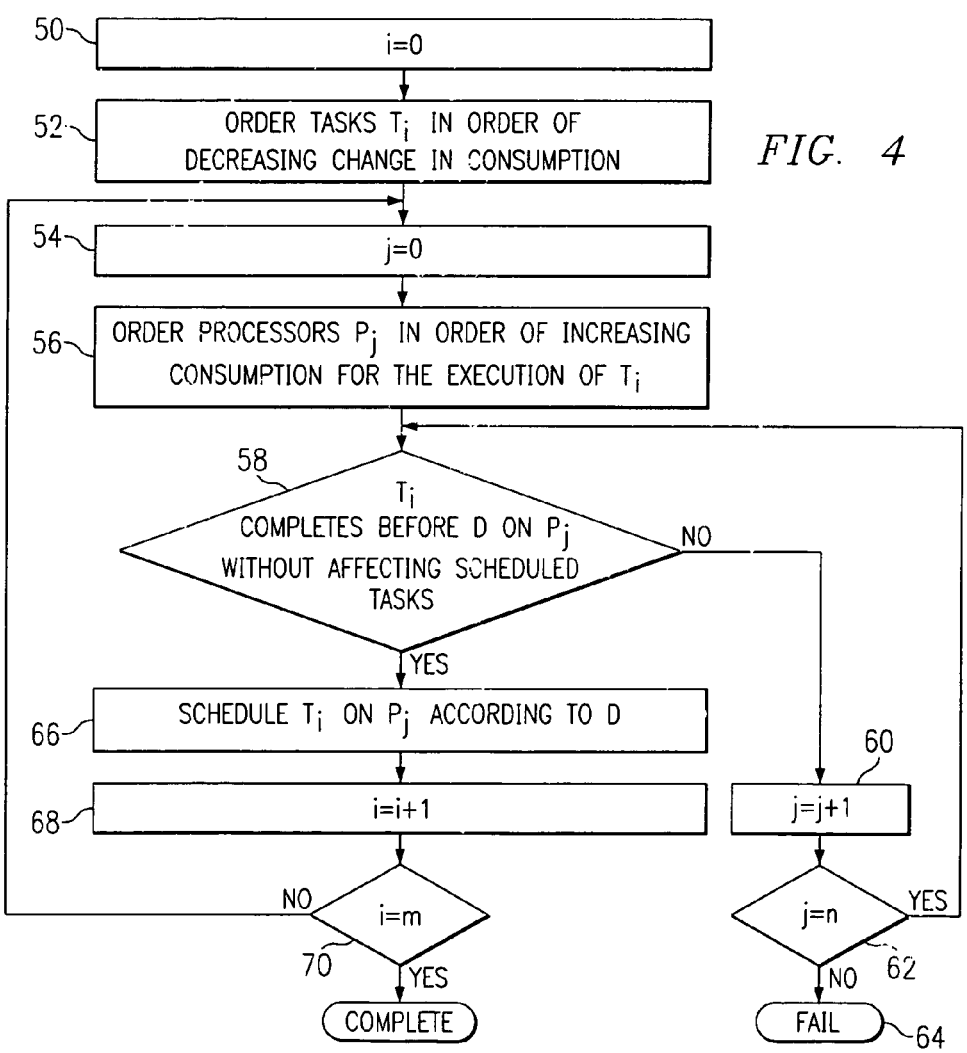
FIG. 4

ENERGY-AWARE SCHEDULING OF APPLICATION EXECUTION

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to processing devices and, more particularly, to application scheduling with energy awareness.

2. Description of the Related Art

In the technical worlds of computing and communications, the fastest evolving technologies involve mobile devices that combine communications and computing functions. New appliances are evolving very quickly, shifting from proprietary environments to open platforms conformance, and, with the arrival of third generation (3G) wireless networks, supporting new applications like multimedia players. But processing requirements to support this new flexibility and new applications are far higher than performances that actual appliances are able to provide. Accordingly, new hardware platforms with more powerful processors have been introduced. But these appliances must deal with embedded systems constraints, mainly power consumption, since powerful processors are generally power hungry components.

Energy consumption is very important to consumers, since mobile devices, such as smart phones, cellular phones, PDAs (personal digital assistants), and handheld computers, command a premium price in order to function apart from a wired power connection. Additionally, size plays an important factor in a consumer's choice of a mobile device and, therefore, the size of the battery is limited. Therefore, it is a high priority for manufacturers to produce devices with long battery lives, without resorting to large battery sizes.

A way to achieve the tradeoff between low power consumption and high performances computations is to use heterogeneous multiprocessor platforms, like OMAP. Several processors in parallel provide the same performance than a uniprocessor platform while using a lower clock frequency, thereby allowing a lower power supply and finally a lower power consumption.

But for a hardware platform to solve the problem of the power consumption, it must have strong software support. Most applications are not designed for multiprocessor platforms, so they cannot exploit the parallelism of the platform. Even if applications express their internal parallelism, a software mechanism is needed to perform computation distribution over processors. Moreover, the evolution of wireless appliances towards open environments, which allows dynamic downloading of unknown applications, prevents usage of precomputed placements.

Therefore, a need has arisen for a method and apparatus for controlling the execution of applications in a mobile communication device to reduce energy consumption.

BRIEF SUMMARY OF THE INVENTION

In the present invention, a mobile device comprises multiple processors and a scheduler for scheduling tasks on the processors. The scheduler schedules tasks by dividing the tasks into two subsets. The first subset is scheduled according to a first procedure that schedules tasks primarily based on a first set of considerations. The second subset is scheduled according to a second procedure that schedules task primarily based on a second set of considerations.

The present invention provides significant advantages over the prior art. Power can be conserved using proper scheduling of tasks on multiple processors. Therefore, the battery life of a mobile communication device can be greatly improved, or the battery capacity can be reduced in order to reduce the device size. Tasks can be scheduled quickly to accommodate real-time on-line tasks.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 3a illustrates a scheduling result of using the real-time constrained procedure on example data;

FIG. 3b illustrates schedule having an energy conservation optimization not rendered by the real-time constrained procedure;

FIG. 4 illustrates a flow chart describing the operation of a power-aware procedure for scheduling tasks primarily based on energy consumption criteria;

DETAILED DESCRIPTION OF THE INVENTION

The present invention is best understood in relation to FIGS. 1-6 of the drawings, like numerals being used for like elements of the various drawings.

Figure 1:
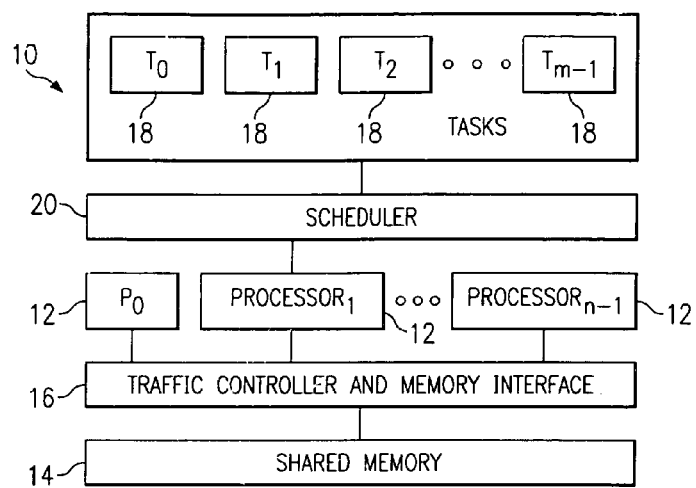
FIG. 1 illustrates a block diagram of a mobile communication device using a scheduler to schedule tasks over multiple processors to reduce energy consumption.

FIG. 1 illustrates a general block diagram of a multiprocessing mobile device 10. Multiple processors 12, shown as $P_0$ through $P_{n-1}$, are coupled to a shared memory 14 through traffic controller and memory interface 16. Processors 12 could include, for example, one or more general-purpose processors, digital signal processors or coprocessors. Processors 12 execute tasks 18, shown as $T_0$ through $T_{m-1}$. A scheduler 20 determines which processor will execute which task. Scheduler 20 may be executed on one of the processors 12 as part of a global operating system. Some or all of the other processors 12 may operate under their own processing system.

For the following discussion of the device 10 of FIG. 1, it is assumed that the task set ($T_i$, $0 \leq i \leq m-1$) is known and that for each task, the following information is known or can be approximated: (1) the deadline for the task (D), the execution time for the task on each processor ($C_j$, $0 \leq j \leq n-1$), and the energy consumption for each task on each processor ($E_j$). It is further assumed that all tasks are ready to execute and that execution of the tasks are not interdependent (i.e., execution of $T_2$ is not dependent upon the completion of $T_1$), although dependence between tasks could be incorporated into the scheduling, if desired.

Table 1 provides an example of six tasks ($T_0$ through $T_5$) to be scheduled for execution on a device having two processors 12. Each task can be executed on either processor, although the energy consumed in executing the task and the time taken to execute the task may not be the same for each processor.

TABLE 1

TASK CHARACTERISTICS OF EXAMPLE 1

|       | $T_0$ | $T_1$ | $T_2$ | $T_3$ | $T_4$ | $T_5$ |
|-------|-------|-------|-------|-------|-------|-------|
| D     | 4     | 6     | 7     | 10    | 14    | 17    |
| $C_0$ | 2     | 3     | 4     | 5     | 6     | 7     |
| $C_1$ | 3     | 5     | 4     | 4     | 9     | 6     |
| $E_0$ | 10    | 8     | 16    | 23    | 43    | 31    |
| $E_1$ | 20    | 14    | 18    | 21    | 38    | 37    |

Each task has a deadline (D)—this factor does not vary depending upon which processor executes the task. The execution time for each task depends upon the processor—$C_0$ is the processing time for the task on processor $P_0$ and $C_1$ is the processing time for the task on processor $P_1$. Similarly, the energy consumption associated with each task depends upon the processor—$E_0$ is the energy consumption for the task on processor $P_0$ and $E_1$ is the energy consumption for the task on processor $P_1$.

Figure 2:
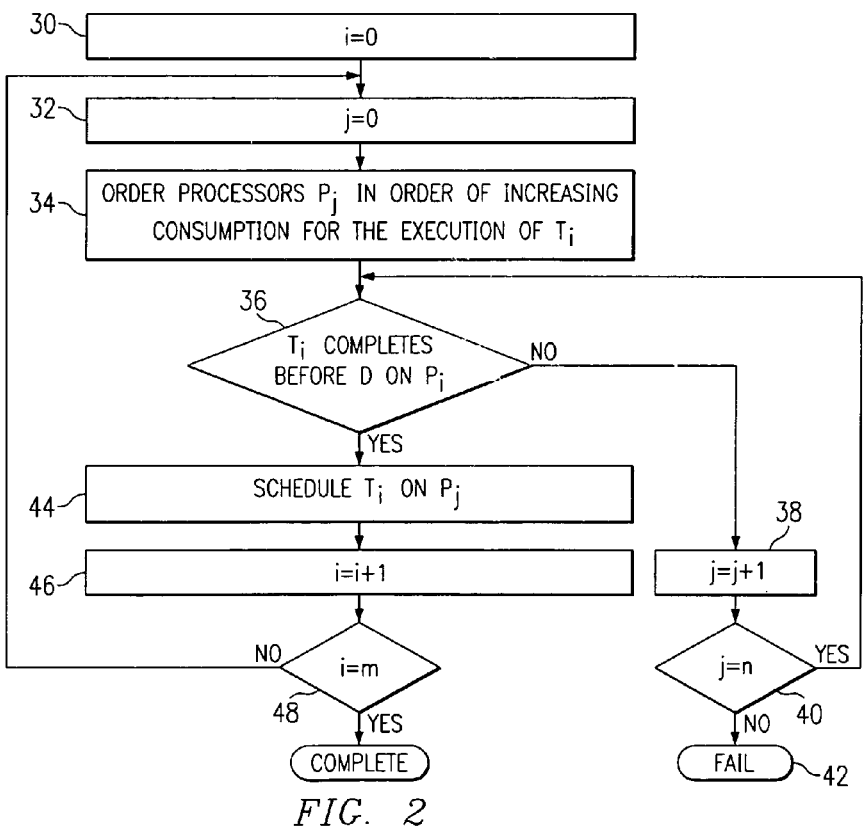
FIG. 2 illustrates a flow chart describing the operation of a real-time constrained procedure for scheduling tasks primarily based on temporal criteria.

FIG. 2 illustrates a flow chart of a real-time constrained procedure for scheduling tasks based primarily on real-time constraints and secondarily on power consumption. The real-time constrained procedure stores relevant information for all tasks in a single list, sorted by increasing deadlines (as shown in Table 1). In step 30, task index i (initially set to "0") is used to identify a given task in the task set. In step 30, processor index j (initially set to "0") is used to identify a given processor. In step 34, the processors $P_j$ are sorted in order of increasing consumption for the execution of the current task $T_i$. In blocks 36, 38 and 40, the processor that will execute the task is chosen. This loop chooses the lowest energy consuming processor for the task that is currently available to schedule the task such that the task is completed prior to its deadline (D). Thus, the power aspect is taken into account, since the procedure considers each processor, from the more power efficient to the less power efficient for this task, and selects the first one that allows the task to complete before its deadline. If no processor is available (j=n), then the procedure fails in block 42.

Returning to decision block 36, if a processor is found, the task is scheduled for execution on that processor in block 44. The next subsequent task is identified in block 46 and the procedure returns to block 32, until all tasks have been executed (i=m) in block 48.

A pseudo-code of this procedure is given below:
1: for each task T taken by order of increasing deadlines do
2: for each processor P taken by order of increasing consumption for the execution of T do
3: if T executed on P completes before its deadline then
4: put T on P according to its deadline and break to the next task
5: end if
6: end for
7: abort (No acceptable placement has been found for the current task)
8: end for This real-time constrained procedure is able to perform a power reduction compared to a non-power-aware procedure, but it misses several important optimizations. FIG. 3a illustrates the effect of the time-constrained procedure using data from Table 1, with the energy consumed by each task in parenthesis. The schedule computed by the real-time constrained procedure generates a total consumption of 137 units.

FIG. 3b illustrates a different schedule for the same set of tasks that has a power consumption of only 128. The main difference between the two schedules comes from the placements of task $T_3$. By executing $T_3$ on $P_2$, there is adequate time to execute T4 and T5 more efficiently on $P_1$. This results in a stronger contribution to the global consumption than the energy saving attributable to executing $T_3$ on $P_1$.

To achieve better global optimization, a criterion to distinguish tasks that can have the strongest impacts on the global consumption is introduced. Those tasks that have a strong impact on the power optimization are not necessarily tasks with a high power consumption, but rather tasks with larger differences between their consumptions on the different processors of the platform. Thus, the $\delta(T)$ criterion is defined as the difference between two consumptions of a task T executed on two (or more) different processors. Mathematically, if n is the number of processors on the platform, the definition of $\delta(T)$ is:

$$\max(|E_x - E_y|, 0 \leq x \leq n-1, 0 \leq y \leq n-1)$$

The higher the $\delta(T)$ criterion of a task T is, the more important this task must be considered for optimum scheduling relative to other tasks.

A power-aware based procedure is based on the exploitation of the $\delta(T)$ criterion, shown in FIG. 4. The main concern of the procedure is to achieve good placements for tasks with a high $\delta(T)$ criterion. In block 50, the procedure initializes the task counter i. In block 52, tasks are sorted in order of decreasing change in consumption ($\delta(T)$); i.e., the tasks whose energy consumption are most affected by processor are scheduled earliest. In block 54, the processor counter j is initialized. In block 56, the processors are sorted in order of increasing consumption for the execution of the current task $T_i$. Blocks 58, 60 and 62 form a loop that the procedure determines whether a processor (taken in order of increasing energy consumption for the current task) can accommodate the task by its deadline (D) without preventing a previously scheduled task from completing. If not, the procedure fails in block 64.

If a processor is found in block 58, then the task is scheduled in block 66 according to its deadline, from earliest to latest. The next task is identified in block 68, and the procedure begins at block 54 for the next task, until all tasks are scheduled in block 70.

Thus, the power-aware based procedure distributes tasks from the one with the highest $\delta(T)$ criterion to the task with the lowest $\delta(T)$ criterion. For each task, it considers each placement by order of increasing energy consumption and selects the first one that allows the task to complete before its deadline, taking into account others tasks already assigned to this processor. To deal with temporal constraints, all tasks assigned to a processor are executed according to their deadline, from the earliest to the latest. Thus, before to assigning a task to processor, the scheduler verifies that the task will not prevent another task, with a later deadline, to complete before its deadline—in such a case, the procedure must reject this placement.

Figure 5A:
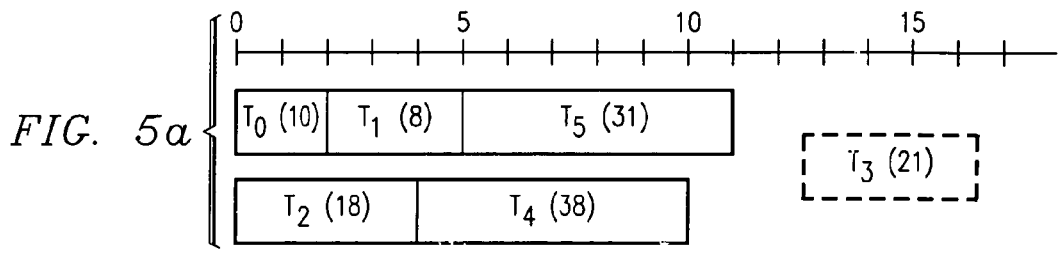
FIG. 5a illustrates a scheduling result of using the power-aware procedure on the example data of FIG. 3a where a failure results.

The pseudocode of this procedure is shown below:
1: for each task T taken by order of decreasing δ(T) do
2: for each processor P taken by order of increasing consumption for the execution of T do
3: if the placement of T on P does not introduce deadline miss for T or an already placed task then
4: put T on P according to its deadline and break to the next task
5: end if
6: end for
7: abort (No acceptable placement has been found for the current task)
8: end for The power aware procedure shows good performances in power reduction, but is not able to find a schedule in numerous cases. Table 2 illustrates the tasks of Table 1, sorted by δ(T). For purposes of illustration, the task indices are the same as those shown in Table 1. As shown in FIG. 5a, the power-aware procedure aborts when it tries to place the task $T_3$. The problem occurs when the procedure attempts to schedule $T_3$—if $T_3$ is put on processor $P_0$, then task $T_5$ (previously scheduled) cannot complete before its deadline, whereas when $T_3$ is put on processor $P_1$, task T4 cannot complete before its schedule.

TABLE 2

CHARACTERISTICS OF EXAMPLE 2

|  | $T_0$ | $T_1$ | $T_5$ | $T_4$ | $T_2$ | $T_3$ |
|---|---|---|---|---|---|---|
| D | 4 | 6 | 17 | 14 | 7 | 10 |
| $C_0$ | 2 | 3 | 7 | 6 | 4 | 5 |
| $C_1$ | 3 | 5 | 6 | 9 | 4 | 4 |
| $E_0$ | 10 | 8 | 31 | 43 | 16 | 23 |
| $E_1$ | 20 | 14 | 37 | 38 | 18 | 21 |
| δ(T) | 10 | 6 | 6 | 5 | 2 | 2 |

Figure 5B:
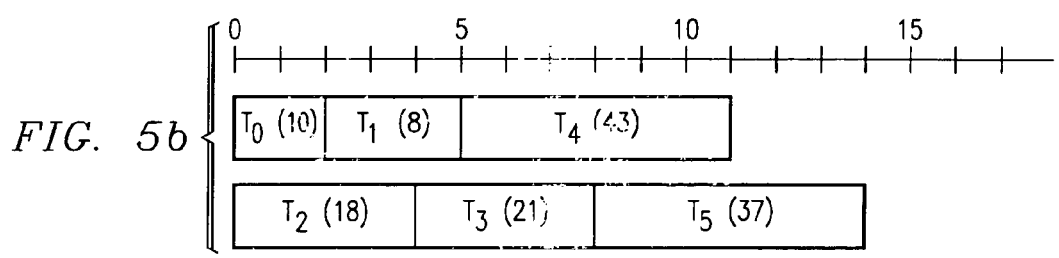
FIG. 5b illustrates a schedule without failure not rendered by the power-aware procedure.

However, a possible schedule of this set of task exists, as shown in FIG. 5b. As can be seen, in some instances, the power-aware procedure places too much importance on power consumption, and the ordering of tasks lists by increasing deadlines is not sufficient to provide a good temporal behavior of the system.

At this point, two procedures with opposite primary concerns: the real-time-constrained procedure has acceptable real time performances but can miss possible power optimizations; the power-aware procedure performs good power optimizations but can abort in cases where possible schedules exist.

Figure 6:
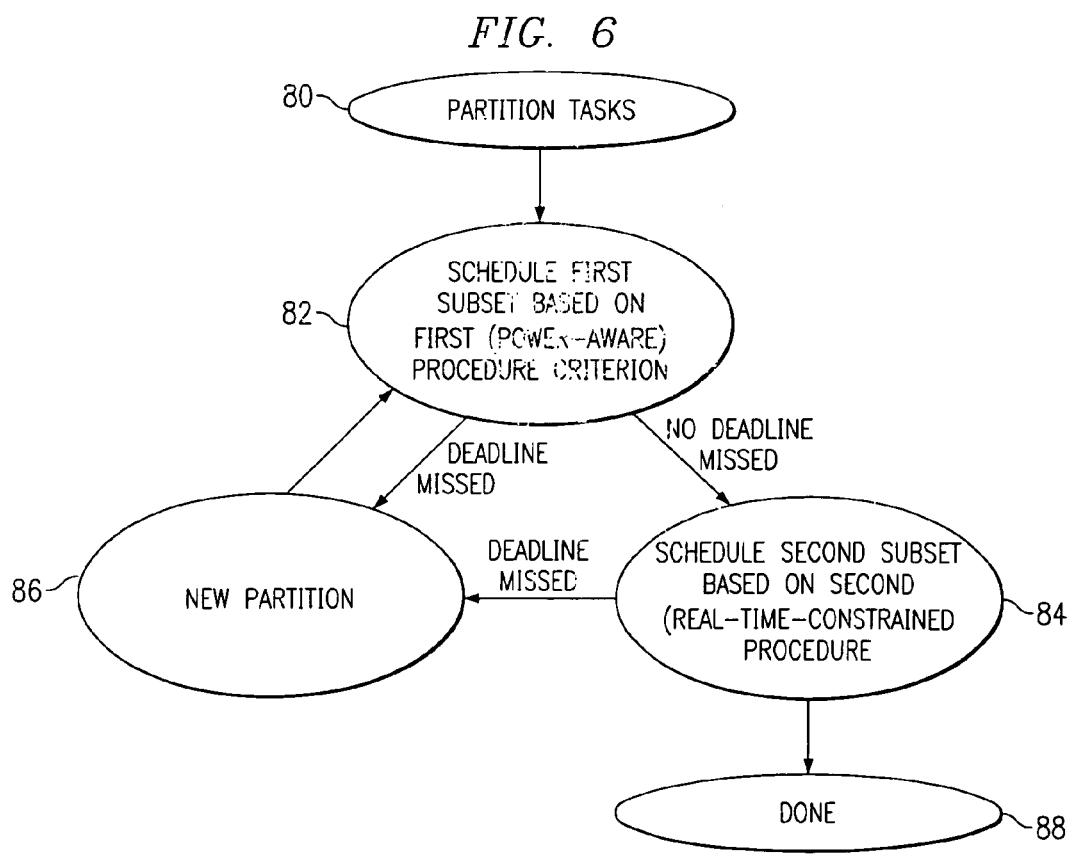
FIG. 6 illustrates a state diagram of a globally-aware procedure incorporating the power-aware procedure of FIG. 4 and the real-time constrained procedure of FIG. 2 to optimize energy conservation and reduce scheduling failures.

FIG. 6 illustrates a global-aware procedure that merges two procedures in order to take advantage of their strength and to compensate their weakness. While the invention could use any two (or more) procedures based on desired criteria for scheduling a task, it will be illustrated herein using the power-aware procedure and the time-constrained procedure described above. The merge of the two procedures is achieved through a split of the set of task into two subsets; in this case, the first subset contains tasks with the highest δ(T) criteria and the second subset contains the remaining tasks sorted according to deadlines. The first subset is scheduled by the power-aware procedure, whereas the second subset is scheduled by the real-time constrained procedure.

In FIG. 6, the set of tasks are partition into two subsets in state 80. Guidelines for partitioning the tasks are discussed below. In state 82, the first subset of tasks are scheduled according to the power-aware procedure, which will provide the optimal scheduling with regard to energy consumption for those tasks that will benefit most from such scheduling, i.e., the tasks with high δ(T) criteria. If no deadline is missed in scheduling the first subset, the second subset of tasks is scheduled according to the real-time-constrained procedure in state 84. If the scheduling of either subset results in a missed deadline, the partition is changed in state 86 such that one or more tasks are switched from the first subset to the second subset. Once the scheduling of both subsets without missed deadlines is complete, the scheduling is done in state 88.

The power-aware procedure shows good power reduction is possible when the scheduler works on lightly loaded processors, so the globally-aware procedure starts applying the power-aware procedure. According to this strategy, it starts considering tasks with highest δ(T) criteria. But to prevent real time performance problems that come with the real-time-constrained procedure's strategy, only a subset of tasks are placed with it. Once this subset is scheduled, the globally-aware procedure switches to the real-time-constrained procedure's strategy, considering remaining tasks according to their deadline and placing them by order of increasing deadlines. The pseudo-code of the globally-aware procedure is given below:
1: end←FALSE
2: chose an initial tasks partition into two subsets
3: repeat
4: apply power criterion procedure to the first subset
5: if no deadlines are missed then
6: apply the real-time constrained procedure to the second subset
7: if no deadlines are missed then
8: end←TRUE
9: else:
10: compute a new task partition
11: end if
12: else
13: compute a new task partition
14: end if
15: until end=TRUE The two subsets should be generated in order to get high power reduction and good real time behavior. Because, for a given set of m tasks, $2^m$ different combinations are possible and the procedure aims to be used for scheduling real-time events and therefore must schedule the tasks quickly. Since it may not be possible to consider all possible partitions to determine the best trade-off between power reduction and performances, and a search and test strategy is used in the preferred embodiment. Because overhead caused by scheduling computations is always a critical problem to system performance, and especially when it is an on-line real-time scheduling, the number of partitions the procedure has to consider is limited.

The choices of the initial task partition and the manner in which tasks are moved from the first subset to the second subset have an impact on the procedure complexity. In one implementation of the procedure, the initial partition puts all tasks in the first subset and has an empty second subset. When tasks are moved on-by-one from the first subset to the second one, this implementation of the procedure has a complexity of $O(m^3)$ where m is the number of tasks. When the strategy is changed to move half of the tasks of the first subset to the second subset upon a scheduler failure, the complexity decreases to $O(m^2 \cdot \log(m))$.

While the invention has been discussed herein as partitioning the tasks according to goals of energy conservation and real-time constraints, the partitioning of the tasks could also be used to balance other constraints by a operating system designer.

Certain adaptations are required to implement the globally-aware procedure in a real system. The main modification is the support of periodic tasks. Periodic tasks are considered as periodic arrivals of new tasks. When a task completes, it is removed from the set of tasks. Thus, the set of tasks handled by the scheduler is varying with time. Each time a new task is added to the set of tasks, a new schedule is computed in the following way:
1. all tasks whose execution has already been started are placed on the processor that starts their execution,
2. all others tasks are placed using the globally-aware scheduling procedure, taking into account previously placed tasks.

The present invention provides significant advantages over the prior art. Power can be conserved using proper scheduling of tasks on multiple processors. Therefore, the battery life of a mobile communication device can be greatly improved, or the battery capacity can be reduced in order to reduce the device size. Tasks can be scheduled quickly to accommodate real-time on-line tasks.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A mobile device comprises:
multiple processors, each enabled to execute any one of a set of tasks that execute on any one of said processors;
a scheduler for scheduling the set of tasks on said processors by:
allocating the tasks of the set to first and second subsets having members that are tasks selected from the set;
determining differentials in a performance criterion between running each task in the first subset on a particular processor relative to another processor, wherein said performance criterion comprises a single task executing independently on a single processor;
scheduling the tasks allocated to the first subset according to a first procedure that schedules tasks primarily on a first set of considerations which prioritize scheduling based at least in part on the differentials in the performance criterion;
scheduling tasks allocated to the second subset according to a second procedure that schedules tasks primarily based on a second set of considerations different than said first set of considerations, where tasks can be moved between subsets.

2. The mobile device of claim 1 wherein said first set of considerations is based on energy conservation.

3. The mobile device of claim 1 wherein the second set of considerations is based on deadlines associated with the tasks.

4. The mobile device of claim 3 wherein said second procedure schedules tasks in order of deadlines associated with the tasks.

5. The mobile device of claim 1 wherein tasks are moved from said first subset to said second subset responsive to a scheduling failure.

6. The mobile device of claim 5 wherein said first subset includes tasks with higher energy deviations than those in said second subset.

7. The mobile device of claim 5 wherein the tasks ranked in the lower half are moved from said first subset to said second subset.

8. The mobile device of claim 1 wherein a portion of said first subset is scheduled according to a first procedure and wherein a portion of said second subset is scheduled according to a second procedure.

9. The mobile device of claim 8 wherein the remaining tasks of said first subset is scheduled according to a first procedure and wherein the remaining tasks of said second subset is scheduled according to a second procedure.

10. The mobile device of claim 1 wherein one task of said first subset is scheduled according to a first procedure and subsequently one task of said second subset is scheduled according to a second procedure, alternating a task from each subset until complete.

11. A mobile device comprises:
multiple processors, each enabled to execute any one of a set of tasks that execute on any one of said processors;
a scheduler for scheduling the set of tasks on said processors by:
allocating the tasks of the set to first and second subsets having members that are tasks selected from the set;
determining differentials in a performance criterion between running each task in the first subset on a particular processor relative to another processor;
scheduling the tasks allocated to the first subset according to a first procedure that schedules tasks primarily on a first set of considerations which prioritize scheduling based at least in part on the differentials in the performance criterion, wherein said first set of considerations is based on energy conservation and wherein said first procedure schedules tasks in order of an energy deviation criterion associated with each of the tasks that defines a differential in energy consumption based on scheduling each task on different ones of said processors; and
scheduling tasks allocated to the second subset according to a second procedure that schedules tasks primarily based on a second set of considerations different than said first set of considerations, where tasks can be moved between subsets.

12. A computer implemented method of scheduling multiple tasks on a mobile device including multiple processors, each processor enabled to execute any one of the multiple tasks, wherein the multiple tasks execute on any one of said processors, comprising the steps of:
allocating the selected ones of the multiple tasks to first and second subsets of the multiple tasks having members that are tasks selected from the multiple tasks;
scheduling tasks allocated to the first subset according to a first procedure that schedules tasks primarily on a first set of considerations which prioritize scheduling based at least in part on an assessed differentials in a performance criterion between running each task independently in the first subset on a particular processor relative to another processor;
scheduling tasks allocated to the second subset according to a second procedure that schedules tasks primarily based on second set of considerations different from said first set of considerations; and
changing the allocation of tasks between subsets.

13. The method of claim 12 wherein said first set of considerations is based on energy conservation.

14. The method of claim 12 wherein the second set of considerations is based on deadlines associated with the tasks.

15. The method of claim 14 wherein said second procedure schedules tasks in order of deadlines associated with the tasks.

16. The method of claim 12 wherein tasks are moved from said first subset to said second subset responsive to a scheduling failure.

17. The method of claim 16 wherein said first subset includes tasks with higher energy deviations than those in said second subset.

18. The method of claim 16 wherein the tasks ranked in the lower half are moved from said first subset to said second subset.

19. A computer implemented method of scheduling multiple tasks on a mobile device including multiple processors, each processor enabled to execute any one of the multiple tasks, wherein the multiple tasks execute on any one of said processors, comprising the steps of:
 allocating the selected ones of the multiple tasks to first and second subsets of the multiple tasks having members that are tasks selected from the multiple tasks;
 scheduling tasks allocated to the first subset according to a first procedure that schedules tasks primarily on a first set of considerations which'prioritize scheduling based at least in part on an assessed differentials in a performance criterion between running each task in the first subset on a particular processor relative to another processor, wherein said first set of considerations is based on energy conservation and wherein said first procedure schedules tasks in order of an energy deviation criterion associated with each of the tasks that defines a differential in energy consumption based on scheduling each task on different ones of said processors;
 scheduling tasks allocated to the second subset according to a second procedure that schedules tasks primarily based on second set of considerations different from said first set of considerations; and
 changing the allocation of tasks between subsets.

20. A mobile device comprises:
 multiple processors, each enabled to execute any one of a set of tasks that execute on any one of said processors;
 a scheduler for scheduling the set of tasks on said processors by:
  allocating the tasks of the set to first and second subsets having members that are tasks selected from the set;
  scheduling tasks allocated to the first subset according to a first procedure that schedules tasks primarily on a first set of considerations, wherein said procedure comprises a single task executing independently on a single processor;
  scheduling tasks allocated to the second subset according to a second procedure that schedules tasks primarily based on a second set of considerations different than said first set of considerations; and
  upon a scheduling failure, changing the allocation of one or more tasks from said first subset to said second subset and repeating said steps of scheduling the tasks allocated to the first subset and scheduling the tasks allocated to the second subset.

* * * * *